267/3
D. B. ROGERS.
Car Spring.
No. 782. Reissued July 26, 1859.
Frg 1
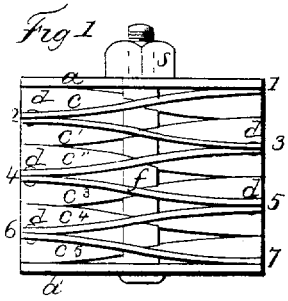
Frg 2
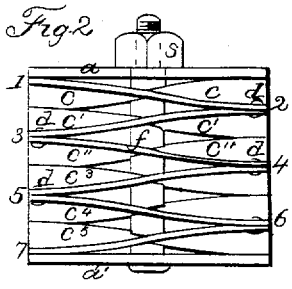
Frg 3
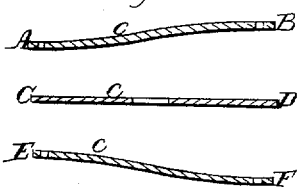
Frg 4
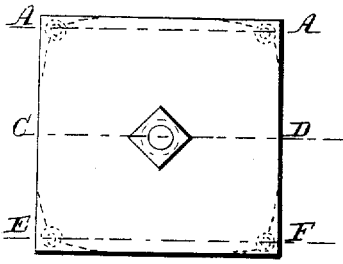
Frg 5
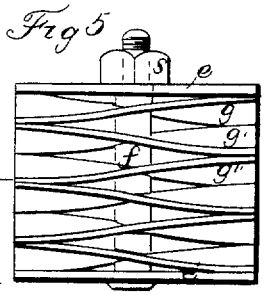
Frg 6
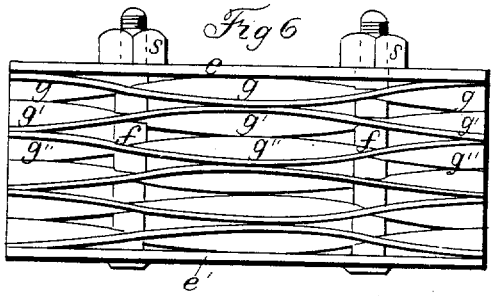
Frg 7
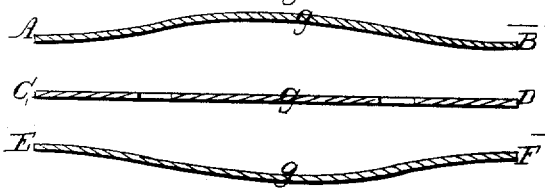
Frg 8
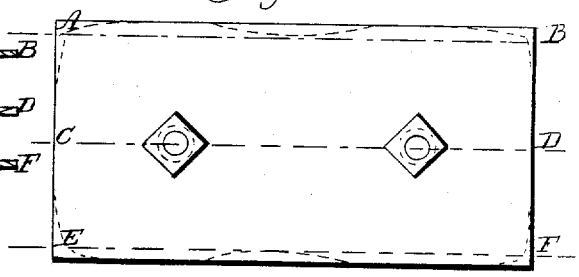
Frg 9
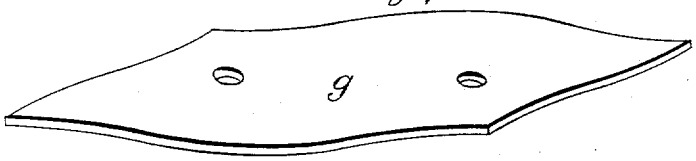
Witnesses
M B Copeland
Marten G Reeling
Inventor;
David B Rogers
N. PETERS, PHOTO-LITHOGRAPHER, WASHINGTON, D. C.

UNITED STATES PATENT OFFICE.

DAVID B. ROGERS, OF PITTSBURG, PENNSYLVANIA.

IMPROVEMENT IN RAILROAD-CAR SPRINGS.

Specification forming part of Letters Patent No. 19,448, dated February 23, 1858; Reissue No. 782, dated July 26, 1859.

*To all whom it may concern:*

Be it known that I, DAVID B. ROGERS, of Pittsburg, in the county of Allegheny and State of Pennsylvania, have invented a new and useful Improvement in Springs for Railroad and other Cars and Carriages; and I do hereby declare the following to be a full, clear, and exact description thereof, reference being had to the annexed drawing, forming part of this specification.

My improvement consists in constructing a carriage or car spring of a series of two or more plates or leaves of steel so bent, curved, or twisted as that the longitudinal curve on one side or edge of each plate or leaf shall be the reverse of the longitudinal curve on the opposite side or edge of the same plate or leaf, while a longitudinal line at the center of each plate midway from either edge is straight or nearly so, and so arranging these plates one above the other that on each side the curve of each plate or leaf shall be in the reverse direction to the curve of the plate or leaf next above or below it. The effect of this construction and arrangement of the plates of the spring is to give each plate a cross-corner bearing on the plate next below it, and, as the center of each plate longitudinally is a straight line, gives a spring which will not extend longitudinally beyond the length of the central line, when the ends of each plate were straight and square with the sides before being bent, curved, or twisted. It also gives a spring of sufficient elasticity and power of endurance for railroad purposes.

The principle on which my improvement is based is equally applicable under each of the three following-named modifications or modes of application, viz: I. Where the plates of the spring are each so long as to present on each side a waving line formed by a succession of circular or elliptical arcs, reversed, so as to be alternately convex and concave and touching each other tangentially; or, II. Where each plate or leaf is only so long as to form on each side a single arc, so that on both sides of the plate the ends at the edge shall be the same distance on one side above, and on the other side below, the apex of the curve; or, III. Where each plate or leaf is only one-half of the length of a single arc, so that on both sides one corner of each plate shall be as much above as the other corner (on the same side) is below the central point at the edge of the plate.

The spring resulting from the use and application of the two latter of the above-mentioned modifications I have found to be the most desirable in practice, and are those which I have delineated in the drawings accompanying this specification, and which, in order to enable others skilled in the art to construct and use my invention, I shall proceed more particularly to describe.

In the drawings, Figures 1 to 4 represent the third or last-named mode of applying the principle involved in the construction of my improved spring, and Figs. 5 to 8 represent the second-named modification of that principle. Fig. 9 is a perspective view of the spring shown in Fig. 8. Fig. 1 represents an end view of a spring of six leaves or plates. Fig. 2 is a side or longitudinal view of a spring with six leaves or plates, where each plate forms only one-half of a full arc or curve. Fig. 3 represents three longitudinal sections through a single leaf or plate of the spring shown in Fig. 2, A B being a section at one edge, C D being a section at the center, E F being a section at the other edge. Fig. 4 is a top view of a single plate or leaf of the spring shown in Fig. 2 before being twisted, the dotted lines showing its shape when twisted.

Like letters of reference in the several figures from 1 to 4 denote similar parts of my spring.

In Figs. 1 and 2, *a a'* are the bolsters, between which several leaves of the spring are placed, *a* being the upper, and *a'* the lower, bolster.

*b* is a bolt or stake which unites the bolsters *a a'* and passes through the series of leaves through a hole in the center of each.

*c c' c''*, &c., are the several leaves or plates of the spring. These are usually made for railroad-cars about three and one-half inches wide and about one-fourth of an inch thick, though the size and thickness may be varied as occasion may require. Each plate is of steel and before being curved or twisted is a plane surface with straight edges and ends at right angles to the side. In the spring shown in Fig. 2 the plates are square, or nearly so, being about equal in length and width. Each plate is so twisted or bent, as that on each side one corner is turned up and the other corner turned down and the edge curved from corner to corner. As in Fig. 2, the top leaf, *c*, has its left-hand corner 1 turned up and its right-hand corner 2 turned down, while on the other side of the same plate the left-hand corner is turned down and the right-hand corner is turned up, as will be seen by Fig. 1, which is an end view of Fig. 2, the corners 1, 3, 5, and 7 in Fig. 1 corresponding with the corners 1, 3, 5, and 7 in Fig. 2. This may be more readily understood by reference to Fig. 4, in which the corner marked E, corresponding with corner 1 in Fig. 2, is turned up, while the corner F, corresponding with corner 2 in Fig. 2, is turned down, while on the other side of the plate corner A in Fig. 4 is turned down and the corner B is turned up, so that the section through A B in Fig. 4 is represented by A B Fig. 3, which is curved in one direction, and a section on the opposite side of the leaf, through E F Fig. 4, is represented by E F Fig. 3, which is curved in the opposite direction, while a section through C D Fig. 4, midway from either side, is a straight line, as seen in C D Fig. 3. All of the plates in the series are constructed alike; but when placed together in the spring they are so arranged that the curves are reversed, as shown in Figs. 1 and 2, for if this were not done the plates would lie close together and touch at all points, and would not act as a spring at all. Each leaf has a round hole in its center, through which the bolt or stake *b* passes, which serves to keep them in their proper relative position, the leaves playing loosely on the stake when the bolsters are pressed together by the weight of the car. To insure the plates being retained in their proper position the corners of the several plates which come together are riveted together as seen at *d d*, Figs. 1 and 2.

Now, as the longitudinal central line of each leaf or plate at C D Fig. 4, is a straight line, it is manifest that when the springs are compressed the extreme length of the spring can not exceed the length of the center of the leaves if the edges or sides of the leaves were straight before it was bent or twisted into the required shape; but when the leaves are so twisted, the ends of the leaves will present a slightly-curved line.

The spring thus described is what I call a "single-square" or "half-arc" spring, and is only one-half of the length of the spring shown in Figs. 6, 8, and 9, which I will now proceed to describe.

Fig. 5 is an end view of the spring shown in Fig. 6, and corresponds in appearance with the end view, Fig. 1, of the single-square spring, excepting that the rivets *d d* are not shown, as being unnecessary. Fig. 6 is a longitudinal side view of a double-square or entire-arc spring. Fig. 7 represents three longitudinal sections through a single leaf of the spring shown in Fig. 6. Fig. 8 is a top view of a single leaf of the spring, Fig. 6, before being twisted, the dotted lines showing their shape when twisted. Fig. 9 is a perspective view of a single leaf.

In the several Figs. 5 to 9 like letters of reference denote similar parts of my spring.

In Figs. 5 and 6, *e* is the upper, and *e'* the lower bolster, between which the series of leaves *g g' g''*, &c., of the spring are placed one over the other. The leaves *g g' g''*, &c., are plates of steel of the same thickness and width as those employed in the spring represented in Fig. 2, but about twice the length—that is to say, about twice as long as wide, though it is not necessary to observe this exact proportion nor the precise thickness or width of leaf specified. Each of these leaves *g* is curved longitudinally from corner to corner, with either a convex or concave curvature at one edge, and the opposite edge is curved with the same degree of curvature in the opposite direction, so that when one of these leaves is placed horizontally the two extremities rise above the plane of the longitudinal central line C D to equal height at one side or edge, while at the opposite side or edge the two extremities fall an equal distance below the plane of the central line C D, the one edge being a concave arc and the other edge a convex arc, while the longitudinal line C D at the center of the leaf, between a mean between the two edges, is a straight line, or in practice very nearly so. This conformation of the leaves of the spring is shown more clearly in Figs. 7 and 8, where A B Fig. 7 is a representation of a section through one edge of the leaf A B Fig. 8; and E F Fig. 7 represents a section through the opposite edge of the leaf at E F Fig. 8, while a section, C D, at C D Fig. 8 shows the leaf to be straight. It will be seen by comparing Figs. 7 and 3 that the leaves *c* and *c'*, &c., of Fig. 3 are just one-half of the leaves *f* and *f'*, &c., in Fig. 7, and that the principle in both is the same. These leaves *g g' g''*, &c., are so arranged between the bolsters *e e'*, one above the other, that on each side they present alternately a concave and convex edge, so that any two plates or leaves, for example *g* and *g'*, touch at the center on one side of the spring, while on the other side the same plates or leaves do not touch at the center, but at each extremity or corner. Thus each plate has three bearing-points on the plate next to it at one edge at a point equidistant from each corner, and on the other edge at its two corners, and thus producing an equilibrium of bearing not attainable in curved-plate springs where the plate or leaf is bent or curved in the direction of its length only, and not also in the direction of its width, or both longitudinally and transversely. In this double-square spring, Fig. 6, there are two bolts or stakes, *f f*, placed at equal distances from either end of the leaves and equidistant from their sides. They pass through suitable holes in the leaves made large enough for the easy play of the springs The bolts *f f* have a nut screwed on at one end, by which the whole spring is connected together.

It is manifest that by lengthening the plates or leaves *g g'* so that the edge on either side may represent a waving line, the highest point on one side being opposite the lowest point on the other, a spring may be obtained of any required length and constructed on the same principle; but in practice the spring shown in Fig. 6 will be found most desirable for application to railroad-cars, for which my improved spring is especially designed.

Having thus described my improvement in springs for railroad and other cars or carriages, what I claim as my invention, and desire to secure by Letters Patent, is—

Constructing a carriage or car spring of a series of two or more plates of steel, each of which is so curved or twisted that the longitudinal curve on one edge or side of each leaf or plate shall be the reverse of the curve on the other side or edge, while a longitudinal section through the center of the plate midway from either edge is a straight line, or nearly so, said plates being so arranged relatively to each other that on both sides the curve at the edge of each leaf or plate shall be in the reverse direction to the curve at the edge of the leaf or plate next above or below it.

DAVID B. ROGERS.

Witnesses:

MARTIN G. CUSHING,
JAMES OLD.